Figure 1:
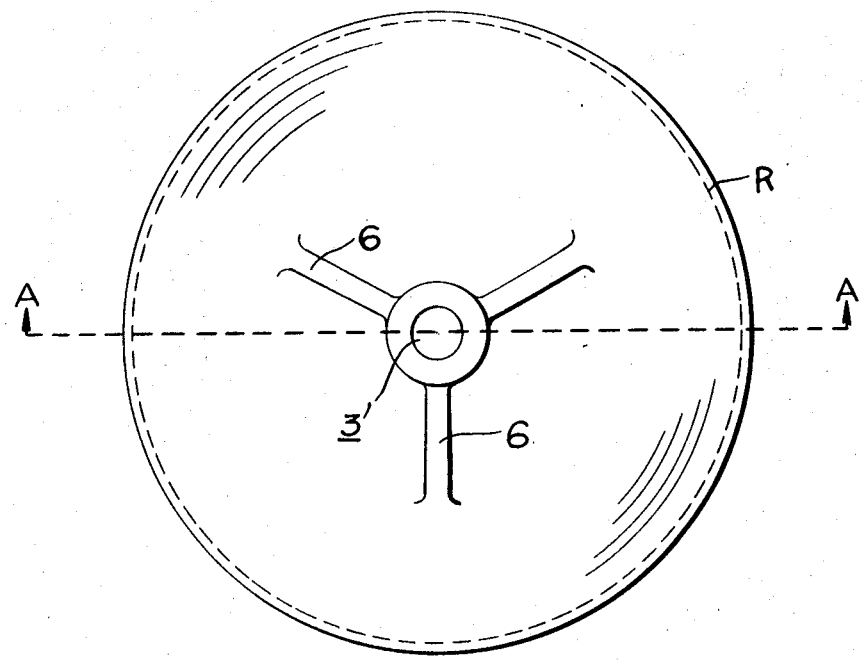

United States Patent

[11] 3,619,295

[72] Inventors Kozo Nishizaki;
Tetuzo Yamazawa; Yoshiaki Okuda, all of Okayama-ken, Japan
[21] Appl. No. 815,142
[22] Filed Apr. 10, 1969
[45] Patented Nov. 9, 1971
[73] Assignee Nippon Carbide Kogyo Kabushiki Kaisha Tokyo, Japan
[32] Priority Aug. 7, 1968
[33] Japan
[31] 43/55507

[54] METHOD OF REMOVING MATTER ADHERING TO INNER WALL OF VINYL CHLORIDE POLYMERIZATION KETTLE
1 Claim, 8 Drawing Figs.
[52] U.S. Cl. .................................... 134/22 R, 134/30, 134/38, 134/40
[51] Int. Cl. .................................... B08b 9/00, B08b 3/10
[50] Field of Search .................................... 134/40, 39, 38, 22, 22 C, 24, 30

[56] References Cited
UNITED STATES PATENTS

| | | | |
|---|---|---|---|
| 2,284,142 | 5/1942 | Gray | 134/38 UX |
| 3,005,734 | 10/1961 | Ells | 134/38 X |
| 3,070,548 | 12/1962 | Brooke | 134/38 X |
| 3,475,218 | 10/1969 | Torrenzano et al | 134/38 X |

Primary Examiner—Morris O. Wolk
Assistant Examiner—Joseph T. Zatarga
Attorney—Sherman and Shalloway ABSTRACT: In removing the polymeric vinyl chloride which remains adhering to the inner wall of a polymerization kettle after having withdrawn the polymerization reaction product from the kettle wherein the polymerization of polymeric vinyl chloride has been completed, the method of removing the adhering polymeric vinyl chloride which comprises drying said adhering matter by heating it under ventilative condition at a temperature 40–80° C. to reduce the moisture content of the adhering matter to below 15 percent and thereafter spraying 1,2-dichloroethane against the dried adhering matter to thereby remove the adhering matter consisting of polymeric vinyl chloride, and an apparatus for practising the above method.

PATENTED NOV 9 1971　3,619,295

SHEET 1 OF 4

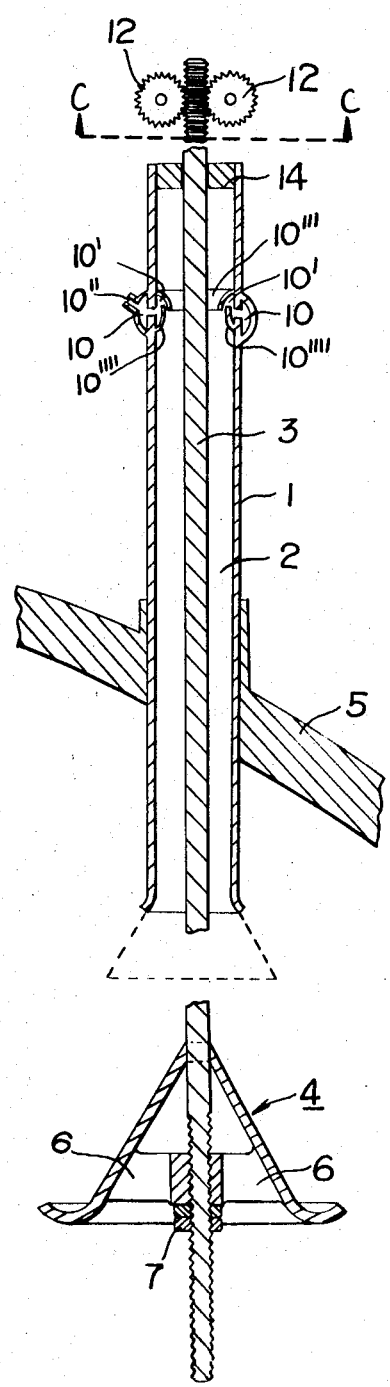

METHOD OF REMOVING MATTER ADHERING TO INNER WALL OF VINYL CHLORIDE POLYMERIZATION KETTLE

This invention relates to an improved method of washing and removing from the kettle wall (i.e. the inner wall of a polymerization kettle) the polymeric vinyl chloride which still remains adhering thereto after the removal of the polymeric reaction product from the kettle after having carried out the polymerization (especially emulsion or suspension polymerization of vinyl chloride. The invention also relates to an apparatus which is suitably used for carrying out the foregoing operation.

More particularly, the invention relates to a method of removing the polymeric vinyl chloride that still adheres to the inner wall of the polymerization kettle after removal of the reaction product and an apparatus suitable for accomplishing this washing operation, the method being characterized in that after having removed the polymeric reaction product from the kettle, the polymeric vinyl chloride that still remains adhering to the inner wall of the kettle is dried until its moisture content is reduced to below 15 percent by heating at a temperature of 40-80° C. under ventilative condition, followed by spraying 1,2-dichloroethane, and preferably 1,2-dichloroethane preheated to a temperature ranging between 30° C. and the boiling point thereof, against the wall at the rate of preferably above 0.1 m.$^3$/m.$^2$ hr. (volume of 1,2-dichloroethane/area of inner wall of polymerization kettle × hours) to remove the adhering polymeric vinyl chloride.

Usually the polymeric vinyl chloride (hereinafter may at times be referred to as merely polymer) is polymerized by feeding monomeric vinyl chloride to a polymerization kettle containing a medium (usually water) and a polymerization catalyst, in the presence of an emulsifier or suspension agent, and stirred, the polymerization heat generated at the time being removed via the wall of the kettle by means of water. After having carried out a polymerization operation such as described for a certain number of hours, the reaction product containing a major portion of the resulting polymer is withdrawn from the withdrawal outlet at the bottom of the polymerization kettle. However, since a considerable amount of the polymer still remains adhering to the inner wall of the polymerization kettle, this must be removed.

While the amount of polymer that adheres to the inner wall of the polymerization kettle and the strength with which it adheres varies depending upon such as the conditions of the polymerization reaction, the cooling method, the material of which the inner wall is made and its smoothness, it is actually impossible to carry out the polymerization of vinyl chloride without causing the adhesion of polymer to the wall of the kettle. If new polymerization reactions are repeated without removal of this adhering matter, the amount adhering gradually increases to result not only in its removal becoming more difficult but also a reduction in the efficiency of the operation as well as a decline in the quality of the product polymer. Hence, exceedingly undesirable results are brought about as a result of this marked decline in the merchandise value of the product.

Heretofore, mechanical force was generally relied on for removing this polymeric vinyl chloride which remains adhered to the kettle wall. That is say, in the present state the adhering matter is scraped off by human labor using a plastic or metallic tool. Since the material of which the inner wall of the kettle is made is usually either glass or stainless steel in most cases, numerous scratches are made in the wall when the removal of the adhering matter is carried out mechanically. And as the kettle wall is reduced in its smoothness, the amount adhered of the polymer is increased more so in the subsequent polymerization reactions. Now, if the removal of this adhering matter is neglected, the amount adhering increases still further to make it necessary to use still sharper tools and much more scraping force for its removal, with the consequence that a vicious cycle of increasing decline in the smoothness of the wall surface and greater difficulty in the removal operation results.

Further, as the size of the polymerization kettle used becomes larger, the working conditions inside the kettle becomes so much worse and much labor and time become necessary when scratches are made on wall surface, thus resulting in a decline in the rate of operation as well as the life of the polymerization kettle.

Lately, a proposal has been made of removing the adhering polymer by means of water pressure using a high-pressure plunger pump. This method, however, is not satisfactory in view of such points as that it requires manpower, it is hazardous, and it requires a prolonged period of time for removing the adhering polymer completely.

As a result of our researches with a view to providing a method by which the polymeric vinyl chloride which remains adhered to the inner wall of a polymerization kettle could be removed commercially advantageously, we discovered that 1,2-dichloroethane was remarkably suitable for removing this hard-to-remove adhering matter.

Further, we succeeded in developing an apparatus of simple construction, which is highly suitable for use in practicing such a method of removing the adhering polymer.

In spite of the fact that it is common sense technically to expect that a good solvent having great dissolving speed which dissolves the adhering matter well would be suitable for the purpose of washing and removing the adhering matter, it was entirely unexpected that the use of 1,2-dichloroethane, which, though having the property of swelling the polymeric vinyl chloride, has substantially lesser dissolving power than the good solvents of polymeric vinyl chloride such as nitrobenzene, tetrahydrofuran, and cyclohexanone, would demonstrate remarkably excellent results in removing the adhering polymeric polyvinyl chloride.

Still further, 1,2-dichloroethane is a poor solvent of polyvinyl chloride in that its property of dissolving polyvinyl chloride at 30° C. is 0.28 gr./100 cc. EDC (EDC is the abbreviation of 1,2-dichloroethane), and at 50° C. is 1.96 gr./100 cc. EDC. Even though it is preheated to a temperature range preferred in the present invention, its dissolving power of polyvinyl chloride is exceedingly low. When this fact is considered along with the fact the hereinbefore mentioned good solvents are solvents in which their dissolving power of polyvinyl chloride is enhanced tremendously by a rise in temperature, the exceedingly high removal capacity demonstrated by 1,2-dichloroethane as compared with the instances where the good solvents are used despite the fact that the former is a very poor solvent even under the operating conditions of the invention was truly surprising.

As a result of further researches, it was found that the polymeric vinyl chloride which remains adhered to the inner wall of the polymerization kettle usually contains about 25-30 percent by weight of water.

And an additional discovery was made of the surprising fact that although it would be expected that the adhering polymeric layer, if dried and reduced of its moisture content by raising the temperature, would become more firmly attached to the inner wall to make its removal still more difficult, the case was exactly the opposite; that is say, by a procedure which consisted of positively reducing the moisture content of the adhering polymeric layer by heating it after the polymerization reaction product has been removed and drying it to a moisture content below 15 percent followed by spraying the wall with 1,2-dichloroethane, which is a poor solvent of polymeric vinyl chloride, a much more superior removal effect can be achieved than the case where the spraying has been conducted without the preheating step.

According to the invention method, the polymeric vinyl chloride remaining adhering to the inner wall after withdrawal of the polymerization reaction product is positively heated and dried at 40°-80° C., and preferably 45°-75° C. under ventilative condition, and the moisture content of the polymer is usually reduced to about 15-7 percent by weight. When the temperature at which the adhering matter is dried is lower than 40° C., the drying requires a very prolonged period of time. On the other hand, when the temperature exceeds 80° C., the adhering matter gels. Hence, temperatures too low or too high are undesirable.

The heating may be accomplished by directly heating the wall of the reactor by circulating a heating medium, say, hot water or steam, through a jacket provided about the reactor. Alternatively, as the air, nitrogen or other inert gases, or a mixture of these which constitutes the ventilative condition, a heated current can be used. Further, the former two means may also be used conjointly. It is inconvenient for the moisture content to exceed 15 percent, since a prolonged period of time will be necessary for the washing the wall.

As regards the determination as to whether or not the moisture content has been reduced to below 15 percent, this can be accomplished by conducting actual tests of the moisture contents in advance in accordance with the various required polymerization conditions and then in the case of identical conditions the moisture content can be readily determined by the heating temperature and time. While the time for this drying operation is controlled by the heating temperature, heating means and heating speed, it can usually be completed in about 3 to 10 minutes by steam heating the polymerization kettle by means of a jacket.

After the drying operation, the dried matters adhering to the inner wall is sprayed with 1,2-dichloroethane. The spraying operation is preferably carried out in a manner such that the whole of the upper part of the adhered portion of the inner wall is covered. While the spraying means itself and modifications thereof can be readily worked out by those skilled in the art, the carrying out of the washing operation by means of the hereinafter described invention apparatus is especially to be preferred.

The spraying need not be continuous but can be carried out intermittently. While it is more advantageous to use the 1,2-dichloroethane to be sprayed after preheating it to a temperature ranging between its boiling point and 30° C., this is not necessarily required.

Further, the spraying is preferably carried out at a rate exceeding $0.1$ m.$^3$/m.$^2$ hr. Usually, it is convenient to operate at a circulatory amount (spraying amount) of the order of $0.1$ m.$^3$/m$^2$ hr.–$0.5$ m.$^3$/m$^2$ hr.

Thus, the polymeric vinyl chloride adhering to the inner wall of the polymerization vessel can be removed very easily and highly efficiently without the necessity of human labor or the necessity of carrying out complicated operations. The inner wall stripped and removed of the adhering matter is then preferably washed further with fresh 1,2-dichloroethane to effect its complete cleaning. It goes without saying that the 1,2-dichloroethane sprayed can be recycled and reused.

Further, the 1,2-dichloroethane may be one in which a small quantity of one or more of such, for example, as water, benzene, xylene, nitrobenzene, tetrahydrofuran, cyclohexanone, acetone, methyl ethyl ketone, chloroform and carbon tetrachloride are mixed in.

Again the term "polymeric vinyl chloride" as used herein, is meant to include besides the homopolymers of vinyl chloride those polymers containing not in excess of 15 percent by weight of other copolymeric components which are copolymerizable with vinyl chloride. As such copolymeric components, included are one or more of the vinyl type monomers such, for example, as vinyl acetate, vinyl propionate, vinylidene chloride, acrylic esters, methacrylic esters, vinyl ether, acrylonitrile, methacrylonitrile, acrylamide, methacrylamide and styrene, and the olefinic monomers such as butadiene, ethylene and propylene.

Now, the separation and removal of the polymer dissolved or suspended in the 1,2-dichloroethane can be separated and purified by evaporating the solvent to leave the polymer in the bottom of the evaporator. It is, however, also possible to effect the separation mechanically in a short period of time and simply by utilizing the physicochemical property of EDC, i.e. the difference in solubility due to difference of temperature, to precipitate the polymer in solution by lowering the temperature, followed by centrifuging or separation by filtration.

Figure 2:
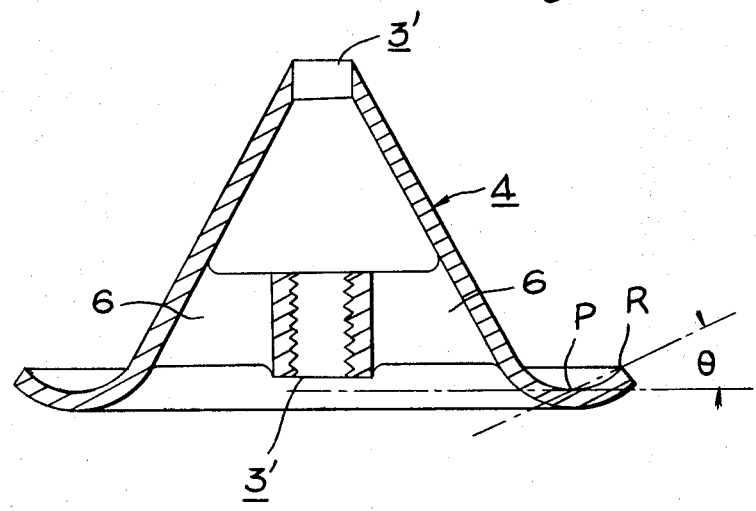
Figure 3:
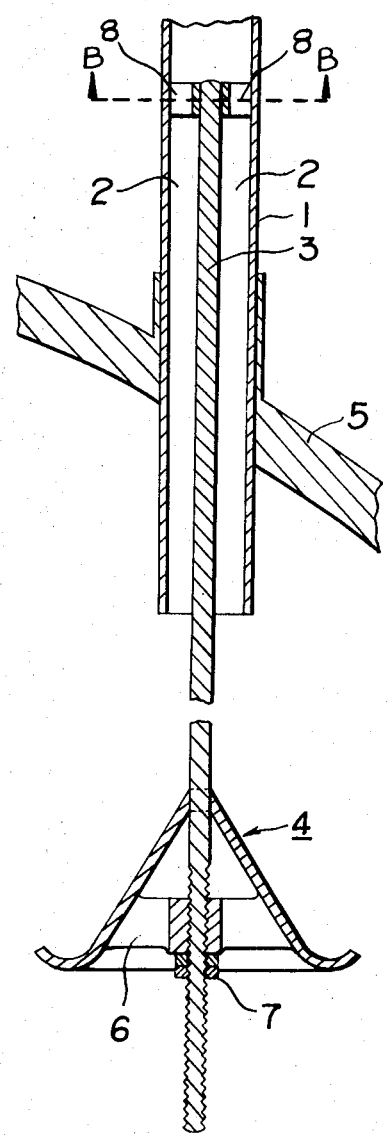
Figures 1, 3:
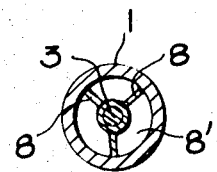
Figures 2, 3:
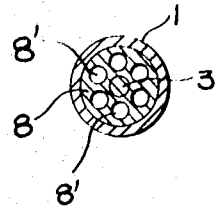
Figure 4:
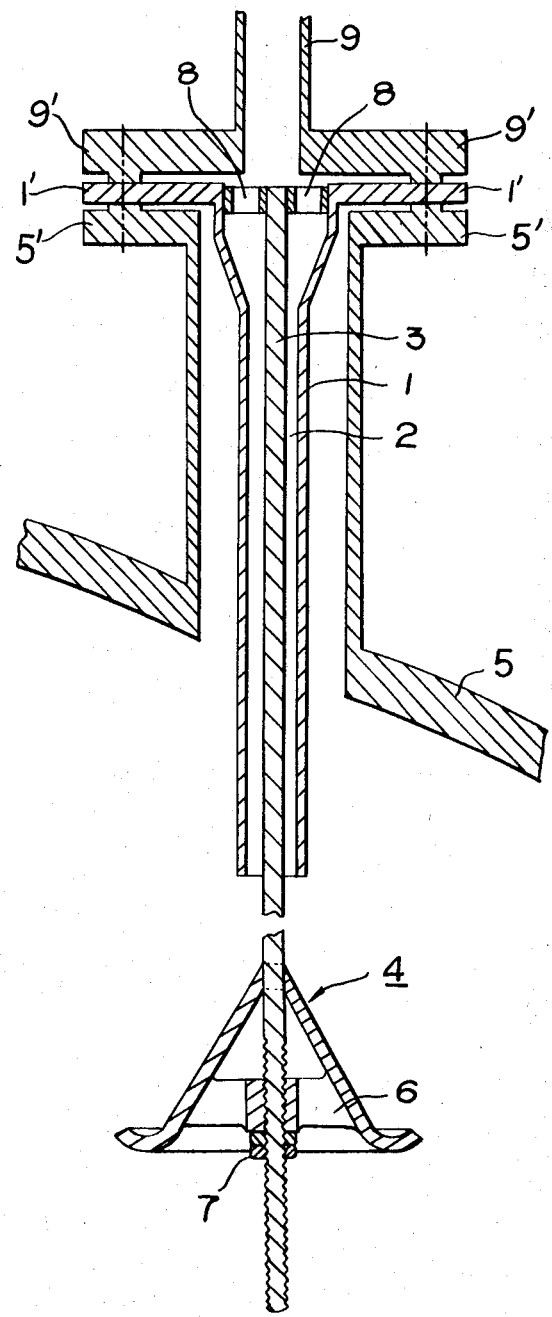

Next, a washing apparatus suitable or use in practicing the method of the present invention will be described with reference to the accompanying drawings wherein:

FIGS. 1 and 2 are respectively a bottom plan view and a sectional view taken along line A—A illustrating an example of a conical distributor of an apparatus according to the present invention for washing the inner wall of a polymerization kettle of its adhering polymer; and FIGS. 3, 4 and 5 are sectional views illustrating several embodiments of the invention apparatus shown installed in the ceiling plate of the polymerization kettle, FIGS. 3—1 and 3—2 being cross-sectional views taken alone line B—B of FIG. 3 and illustrating the modes of supporting the supporting rod in the feed tube, and FIG. 5—1 being a sectional view taken along line C—C of FIG. 5 and illustrating an example of a gear-operated mechanism for shifting the position of the supporting rod.

Referring to the foregoing FIGS., the washing and cleaning apparatus of the present invention comprises a feed tube 1 for the 1,2-dichloroethane to be used for washing the inner wall of the polymerization kettle which has been used for carrying out the batchwise polymerization of polymeric vinyl chloride, this tube being provided in the ceiling plate 5 of the kettle, a distributor supporting rod 3 disposed coaxially in said feed tube 1 and forming an annular passage 2 for the 1,2-dichloroethane between its outer periphery and the inner periphery of the feed tube, and a conical distributor member 4 supported coaxially by said supporting rod at its prolonged portion; and is characterized in that the outer rim R at the bottom of said conical distributor member is positioned in a direction at an angle of 0°–35° to a plane which is at right angles to the axis X of the supporting rod and contacts the lowermost point P of the outer periphery of said distributor member.

In FIG. 3 the feed tube 1 for the 1,2-dichloroethane is provided in the ceiling plate 5 and passing therethrough. Although the upper end of this tube is shown cutaway in the FIGURE, this end is connected via, say, a suitable joint, to a pipe which feeds the dichloroethane.

Supporting rod 3 is disposed coaxially in the feed tube 1 and extends downwardly beyond that end of the tube positioned inside the polymerization kettle. At this prolonged portion of the rod the conical distributor member 4 is supported. Thus a passage for the 1,2-dichloroethane is formed between the inner periphery of the feed tube and the outer periphery of the supporting rod 3 present in said tube. A part of the supporting rod is shown cutaway in the drawings.

Supporting rod 3 can be suitably supported in the feed tube 1 in this case so as to make possible the passage of the washing liquid. For example, in the case of the illustration of FIG. 3—1, shown as a sectional view taken along line B—B of FIG. 3, the rod is supported by three arm plates 8, whereas in FIG. 3—2 is shown an instance wherein the rod is supported by way of a member 8 having a plurality of holes 8' for use as the passage of the washing liquid. The means of support are possible of wide variations in design by those skilled in the art, and various modifications with respect to the position of the support, number and configuration of the arms or supporting members, etc., are possible.

FIGS. 1 and 2 illustrate a typical example of the conical distributor member 4. In these FIGURES the supporting rod is not shown, but the hole 3' which fits the rod is shown. Distributor member 4 is coaxially supported by the supporting rod 3 by means of the hole 3' shown at the upper part of FIG. 2 and the hole 3' at the lower part, which latter is supported by the arms 6, 6. While the support of the conical distributor member 4 by the supporting rod 3 can be made secure so that the former is not detachable, it is preferred that it be made detachable. For example, as shown in FIGS. 3, 4 and 5, by providing the prolonged portion of the supporting rod 3 with suitable threads and supporting the distributor member 4 in a suitable position by means of a double screw 7, it becomes possible to move the distributor member 4 up and down along the supporting rod 3 by rotation of the double screw.

In the invention apparatus, the conical distributor member is so designed that its bottom portion has a suitable curvature to form a curved surface which is horizontally disposed or has a upwardly directed angle. This curved surface, as shown in FIG. 2, is best shown by means of the sectional view taken along the axis X of the distributor member (which coincides with the axis of the supporting rod). That is to say, the rim R at the bottom of the conical distributor member is so designed that the angle θ indicated in the FIGURE is positioned in a direction 0-35° to a plane which is at right angles to the axis X of the supporting rod and contacts the lowermost part P of the outer periphery of said distributor member. While the angular disposition of the rim R is suitably varied depending upon the angle of the generatrix of the cone to the axis X, the width in the lateral direction of the bottom of the distributor forming a curved surface, and also the configuration of the curved surface (i.e. as to whether the concave side curve of the curved portion section of the curved position in FIG. 2 is a part of circular arc or a part of another curve). For example, when the angle formed by the generatrix of the cone and the axis X is about 30° (i.e. the vertical angle of the cone is about 60°) and the concave side curve is a circular arc, an angle θ of about 20°-30 is preferred.

On the other hand, the inside diameter of the distributor member bottom should be greater than the inside diameter of the feed tube. It is usually designed so that the former is at least 1.3 times, and preferably of the order of 1.5-3.5 times, the latter.

FIG. 4 illustrates by means of a similar sectional view as in FIG. 3 a modified embodiment. In the embodiment shown in this Figure an upright portion having a flange 5' of the polymerization kettle ceiling plate 5 is provided and this flange 5' tightly clasps between it and a flange 9' of pipe 9 which feeds the 1,2-dichloroethane into the feed tube 1, a flange 1' which is provided at the upper end of the feed tube 1 (in the FIGURE the bolts and nuts which hold the flanges together are not shown). In the case of this embodiment, disassembly and cleaning of these can be accomplished, as required, by removing the distributor member 4 by turning the double screw 7 and taking out flanged feed tube 1 and the supporting rod 3 after releasing the flange 1' from its tightly clasped engagement by unscrewing the bolts and nuts which hold the flanges together.

FIG. 5 illustrates another modification. In this embodiment the upper end of the feed tube 1 is closed by means of a member 14, and the supporting rod 3 passes through the member 14 in such a manner as to be capable of up-and-down movements. At an upper part of the feed tube 1 there is provided a distributive feed inlet having an overflow type internal annular passage 10' and an external annular passage 10. The washing liquid is introduced from one or more of inlets 10" and is fed into the annular passage 2 of feed tube 1 via a downwardly facing passage formed at the part where the rims of the members 10''' and 10'''', which constitute the aforesaid passage 10', overlap. Needless to say, the means of feeding the washing liquid to the annular passage 2 of feed tube 1 may be a conventional feed inlet or feeding means may be nozzles opening downwardly towards the center of the passage 2.

The upper extended end of the supporting rod 3 may be provided with, say, a pair of gears 12, 12 disposed at the two sides of the rod and in engagement with teeth provided on the rod. Thus, the rod can be moved either upwardly or downwardly by turning the gears simultaneously in the opposite directions; i.e., the supporting rod can be moved downwardly by synchronously turning the gear on the left side in the FIGURE clockwise and the gear on the right side counterclockwise. On the other hand, the supporting rod can be moved upwardly by turning the gear on the left side counterclockwise and the gear on the right side clockwise in similar manner. Thus it becomes possible to adjust the position inside the kettle of the conical distributor member. FIG. 5-1, as a sectional view taken along line C—C of FIG. 5, illustrates the mechanism for moving the rod 3 by means of the gears 12, 12. The reference numerals 13, 13 in the FIGURE denote the rotating shaft of the gears 13, 13.

Further, as shown in FIG. 5 by means of the broken line, the distal end of the feed tube 1 inside the polymerization kettle can be designed with a flare that conforms with that part of the outer periphery of the conical distributor member which corresponds therewith. Then by moving the supporting rod during the polymerization reaction the aforesaid distal end and the conical distributor member can be brought into intimate contact to thereby isolated the inside of the feed tube 1 from the reaction atmosphere, with the consequence that the possibility of the polymer becoming adhered to the feed tube 1 in the vicinity of its distal end as a result of the scattering of the polymer to clog the annular passage 2 in the vicinity of its outlet can be prevented.

A polymerization kettle does not have to be designed anew for using the apparatus of the present invention. The polymerization kettle heretofore being FIGURE can readily be converted and be installed with the invention apparatus.

Although the invention apparatus is, as described hereinbefore, an exceedingly simple apparatus, it has the advantage that the 1,2-dichloroethane to be used for washing the inner wall of the kettle can be efficiently sprinkled uniformly on the wall. For example, the use of a nozzle having a plurality of jetting holes or a revolving sprinkler head not only makes for complexity of the apparatus but also the scattering polymer easily clogs the jetting or sprinkler holes. Hence this type of an apparatus is rather a disadvantage.

While the invention apparatus is installed in the ceiling plate of a batch type polymerization kettle, the position and number of apparatus to be installed can be suitably altered in accordance with the shape, size, etc., of the kettle. The usual practice is to use a plurality of the washing apparatus so designed to spray the washing liquid uniformly all round the inner wall of the kettle.

The method of the present invention fully described hereinbefore can be carried out commercially with especial advantage by using the invention apparatus.

The following examples along with comparison will be given to illustrate the invention more specifically.

The moisture content of the polyvinyl chloride remaining adhering to the wall in this invention was measured by the following method.

Into a flat type weighting bottle having an inside diameter of 50±1.5 mm. whose weight has been rendered constant (the weight is designated A grams) are weighed 3 grams of the specimen accurately to 0.1 mg. (this weight is designated B grams). After heating this at 105±2° C. for 1 hour, it is allowed to cool in a desiccator to room temperature and weighed (this weight is designated C grams). The moisture content is then calculated as follows:

$$\text{Moisture content } (\%) = \frac{B-C}{B-A} \times 100$$

EXAMPLE I

The suspension polymerization of vinyl chloride was carried out in a stainless steel polymerization kettle having a capacity of 14 cubic meters, following which polyvinyl chloride (degree of polymerization 1200) was withdrawn from the withdrawal outlet at the bottom of the kettle. At the time of the completion of this polymerization reaction, the polyvinyl chloride adhering to the entire wall area of the polymerization kettle covered about 30 square meters. The moisture content of this adhering matter was 29 percent. This adhering matter on the inner wall was dried by raising its temperature by circulating 100° C. steam through the kettle jacket for 5 minutes while causing the air in the kettle to circulate by means of a suction fan via a nozzle at the top of the kettle. The temperature of the adhering matter in the polymerization vessel was thus raised to 60° C. and the moisture content was reduced to 14 percent. This was followed by closing the nozzle at the top of the kettle and spraying 40° C. EDC from a washing apparatus of the kind shown in FIG. 4 provided in the ceiling plate at the top of the kettle, the spraying being carried out for 25 minutes at a rate of circulation amounting to 0.3 m.³/m² hr. The EDC flowing down was withdrawn from the withdrawal outlet at the bottom of the kettle and recycled to the washing apparatus at the top of the kettle and reused. After completion of the washing, the adhering matter was completely removed from the inner wall of the kettle to an extent that could not possibly have been accomplished manually.

COMPARISONS I–IV

In dealing with the same adhering matter as in the case with the polymerization kettle described in example I, exactly identical procedures were followed excepting that the treatment was carried out by omitting the foregoing drying operation and hence in a state in which the moisture was fully retained (Comparison I). In this case, at that part corresponding to the gas-liquid boundary portion during the polymerization reaction adhering matter would remain which could not be completely removed.

For removing this adhering matter completely the spraying of EDC had to be continued for a prolonged period of 60 minutes.

Further when exactly identical procedures as described in example I were followed in dealing with the same adhering matter as in said example, except that 100° C. steam was circulated through the jacket of the polymerization kettle and the drying of the adhering matter was carried out at an elevated temperature of 85° C. (Comparison II), the adhering polymer gelled, with the consequence that the insoluble product could not be completely removed even though washing was carried out with EDC.

Further, exactly identical procedures as described in example I were followed in dealing with the same adhering matter as in said example, except that the drying was conducted at a temperature of 30° C. by circulating steam through the jacket of the polymerization kettle for 2 minutes (Comparison III).

The adhering matter after its drying had a moisture content of 27 percent. Even though this adhering matter was washed with EDC for 25 minutes, the adhering matter still remained, and for its complete removal 55 minutes was required.

Further, in washing the same adhering matter as described in example I with EDC, exactly identical procedures were followed as described in said example, except that the adhering matter was dried to a moisture content of 18 percent and the amount circulated of EDC was 0.05 m.³/m² hr. (Comparison IV).

The result was that the adhering matter could not be removed from all areas, there still remaining some at such as the baffle plates of the polymerization kettle.

The particulars of the results obtained in example 1 and Comparisons I–IV are shown in table I.

EXAMPLE II AND COMPARISON V–VI

A vinyl chloride polymer suspension of a degree of polymerization of 1100 polymerized in a glass-lined polymerization kettle of 3 cubic meter capacity was withdrawn. The inside wall of this kettle was covered completely with adhering matter whose moisture content was 27.8 percent. The adhering matter covering the inside wall was dried by circulating 50° C. hot water through the jacket of the polymerization kettle for 9 minutes, with the result that its moisture content was reduced to 13 percent. This was followed by heating EDC to 60° C. and circulating and spraying the heated EDC against the inner wall at the rate of 0.25 m.³/m² hr. (example II).

A similar polymeric adhering matter was made which, after being dried in identical manner, was washed in similar manner using nitrobenzene, a good solvent of vinyl chloride polymers (Comparison V) and likewise cyclohexanone, also a good solvent (Comparison VI), the time required for the removal of the adhering matter being observed. The particulars of the conditions and results obtained in these experiments are shown in table II.

TABLE II

| Experiment | Moisture content of adhering matter (percent) | Drying conditions of adhering matter | | Moisture content of adhering matter after drying (percent) | Washing conditions of the solvents | | Time required for complete removal (min.) |
|---|---|---|---|---|---|---|---|
| | | Temperature (° C.) | Time (min.) | | Class | Temp. (° C.) | |
| Example II | 27.8 | 50 | 9 | 13.2 | EDC | 60 | 24 |
| Comparison: | | | | | | | |
| V | 28.3 | 50 | 9 | 13.5 | Nitrobenzene | 60 | ca. 70 |
| VI | 27.6 | 50 | 9 | 13.2 | Cyclohexanone | 60 | ca. 70 |

As is apparent from table II, it is seen that the time of nitrobenzene and cyclohexanone which are better solvents of polyvinyl chloride than EDC rather than being short are much longer.

EXAMPLE III AND COMPARISON VII

The suspension polymerization reaction of vinyl chloride was carried out in a stainless steel polymerization kettle having a capacity of 24 cubic meters, following which the test for removing the polyvinyl chloride coating adhering to the inner wall of the kettle (about 45 square meters) was conducted using EDC. The polyvinyl chloride which remains adhering to the inner wall of the polymerization kettle (moisture content 29.6 percent) was dried for 6 minutes by raising the temperature of the inner wall to 65° C. The so dried polyvinyl chloride (moisture content 12.8 percent) was sprayed with EDC at the rate of 0.35 m.³/m²hr. The adhering matter was completely removed in 23 minutes. (Example III) When the same operation was carried out similarly for 23 minutes without drying the adhered matter, i.e. in the state where it contained the initial amount of moisture (Comparison VII), the result was unsatisfactory, and 45 minutes of washing time was required to attain a result comparable to that where drying was carried out before the washing operation.

EXAMPLE IV

Example I was repeated except that instead of carrying out the homopolymerization of vinyl chloride the copolymerization of vinyl chloride and propylene (copolymer containing 7 percent propylene) was carried out. The copolymer remained adhering to the baffle plate portion of the polymerization ket-

TABLE I

| Experiment | Moisture Content of adhering matter (percent) | Drying conditions of adhering matter | | | Moisture content of adhering matter after drying (percent) | ED circulation conditions | | | Removal effect determination |
|---|---|---|---|---|---|---|---|---|---|
| | | Steam (° C.) | Time (min.) | Surface temperature (° C.) | | Temp. (° C.) | Time (min.) | Amount (m.³/m.² hr.) | |
| Example I | 29 | 100 | 5 | 60 | 14 | 40 | 25 | 0.3 | Completely removed. |
| Comparison: | | | | | | | | | |
| I | 29 | | | | 29 | 40 | 25 | 0.3 | Poor. |
| II | 29 | 100 | 12 | 85 | 11 | 40 | 25 | 0.3 | Do. |
| III | 29 | 100 | 2 | 30 | 27 | 40 | 25 | 0.3 | Do. |
| IV | 29 | 100 | 4 | 65 | 18 | 40 | 25 | 0.25 | Do. | tle had a moisture content of 35.3 percent, which was reduced to 14.2 percent by drying. This adhering matter was completely removed by washing with EDC as in example I.

We claim:

1. In removing the polymeric vinyl chloride which remains adhering to the inner wall of a polymerization kettle after having withdrawn the polymerization reaction product from the kettle wherein the polymerization of polymeric vinyl chloride has been completed, the method of removing the adhering polymeric vinyl chloride which comprises drying said adhering matter by heating it under ventilative condition at a temperature 40°–80° C. to reduce the moisture content of the adhering matter to below 15 percent and thereafter spraying 1,2-dichloroethane against the dried adhering matter to thereby remove the adhering matter consisting of polymeric vinyl chloride.

* * * * *